(12) United States Patent
Hippeläinen et al.

(10) Patent No.: US 6,446,674 B1
(45) Date of Patent: Sep. 10, 2002

(54) METHOD OF PRODUCING HOMOGENEOUS MATERIAL WITH AN EXTRUDER, AN EXTRUDER, AND A MULTILAYER PLASTIC PIPE

(75) Inventors: Esko Hippeläinen, Lahti (FI); Kari Kirjavainen, Espoo (FI); Jyri Järvenkylä, Hollola (FI)

(73) Assignee: Uponor Innovation AB, Fristad (SE)

( * ) Notice: Subject to any disclaimer, the term of this patent is extended or adjusted under 35 U.S.C. 154(b) by 0 days.

(21) Appl. No.: 09/559,370

(22) Filed: Apr. 27, 2000

Related U.S. Application Data

(62) Division of application No. 09/077,902, filed as application No. PCT/FI96/00658 on Dec. 12, 1996, now Pat. No. 6,073,657.

(30) Foreign Application Priority Data

| Dec. 12, 1995 | (FI) | ................................................ 955960 |
| Feb. 8, 1996 | (FI) | ................................................ 960589 |
| Apr. 29, 1996 | (FI) | ................................................ 961822 |

(51) Int. Cl.[7] .............................. F16L 11/00; F16L 9/14
(52) U.S. Cl. .................... 138/153; 138/141; 138/144; 138/125
(58) Field of Search ................................ 438/141, 144, 438/153, 125; 264/173, 45.3, 237; 366/80, 90; 428/35.7, 36

(56) References Cited

U.S. PATENT DOCUMENTS

| 3,314,108 A | | 4/1967 | Wienand et al. ................ 18/12 |
| 3,425,455 A | | 2/1969 | Kilpert et al. ............... 138/143 |
| 3,561,493 A | | 2/1971 | Maillard ...................... 138/141 |
| 3,854,504 A | * | 12/1974 | Morrison et al. ........... 138/141 |
| 3,939,873 A | * | 2/1976 | Rinker et al. ................ 138/144 |
| 3,967,650 A | * | 7/1976 | Borge .......................... 138/144 |
| 4,003,408 A | * | 1/1977 | Turner ....................... 138/118 |
| 4,161,379 A | * | 7/1979 | Sudyk ......................... 425/112 |
| 4,249,875 A | * | 2/1981 | Hart et al. ................ 425/133.1 |
| 4,347,090 A | * | 8/1982 | Anderson et al. ........... 156/149 |
| 4,364,882 A | | 12/1982 | Doucet ....................... 264/45.9 |
| 4,522,775 A | * | 6/1985 | Briggs et al. ................ 264/173 |
| 4,840,986 A | * | 6/1989 | Inoue et al. ................. 524/436 |
| 5,180,531 A | * | 1/1993 | Borzakian ................... 264/45.3 |
| 5,286,553 A | * | 2/1994 | Haraguchi et al. .......... 428/233 |
| 5,313,987 A | | 5/1994 | Rober et al. ................ 138/137 |
| 5,387,386 A | | 2/1995 | Kirjavainen ................. 264/173 |
| 5,449,024 A | | 9/1995 | Rober et al. ................ 138/137 |
| 5,671,780 A | * | 9/1997 | Kertesz ....................... 138/127 |
| 5,789,470 A | * | 8/1998 | Herbst et al. ................ 524/100 |

FOREIGN PATENT DOCUMENTS

| CH | 568148 | 10/1975 |
| DE | 372214 | 3/1923 |
| DE | 1092176 | 11/1960 |

(List continued on next page.)

OTHER PUBLICATIONS

Derwent's Abstract of SU 1,384,394 of Mar., 1988.
Patent Abstracts of Japan of JP 58–27040 of Feb. 1983.

*Primary Examiner*—Lesley D. Morris
*Assistant Examiner*—David Hwu
(74) *Attorney, Agent, or Firm*—Ladas & Parry

(57) ABSTRACT

An extruded multilayer plastic pipe is provided. The pipe comprises an inner layer, an outer layer and an intermediate layer. Each of the inner and outer layers is comprised of a thermoplastic material. The intermediate layer consists essentially of a lower density material than said inner and outer layers, and the intermediate layer is situated between and abuts both the inner layer and the outer layer. At least one of the inner, outer and intermediate layers consists of reinforced solid or foamed reprocessed plastic.

26 Claims, 8 Drawing Sheets

FOREIGN PATENT DOCUMENTS

Figure 1:
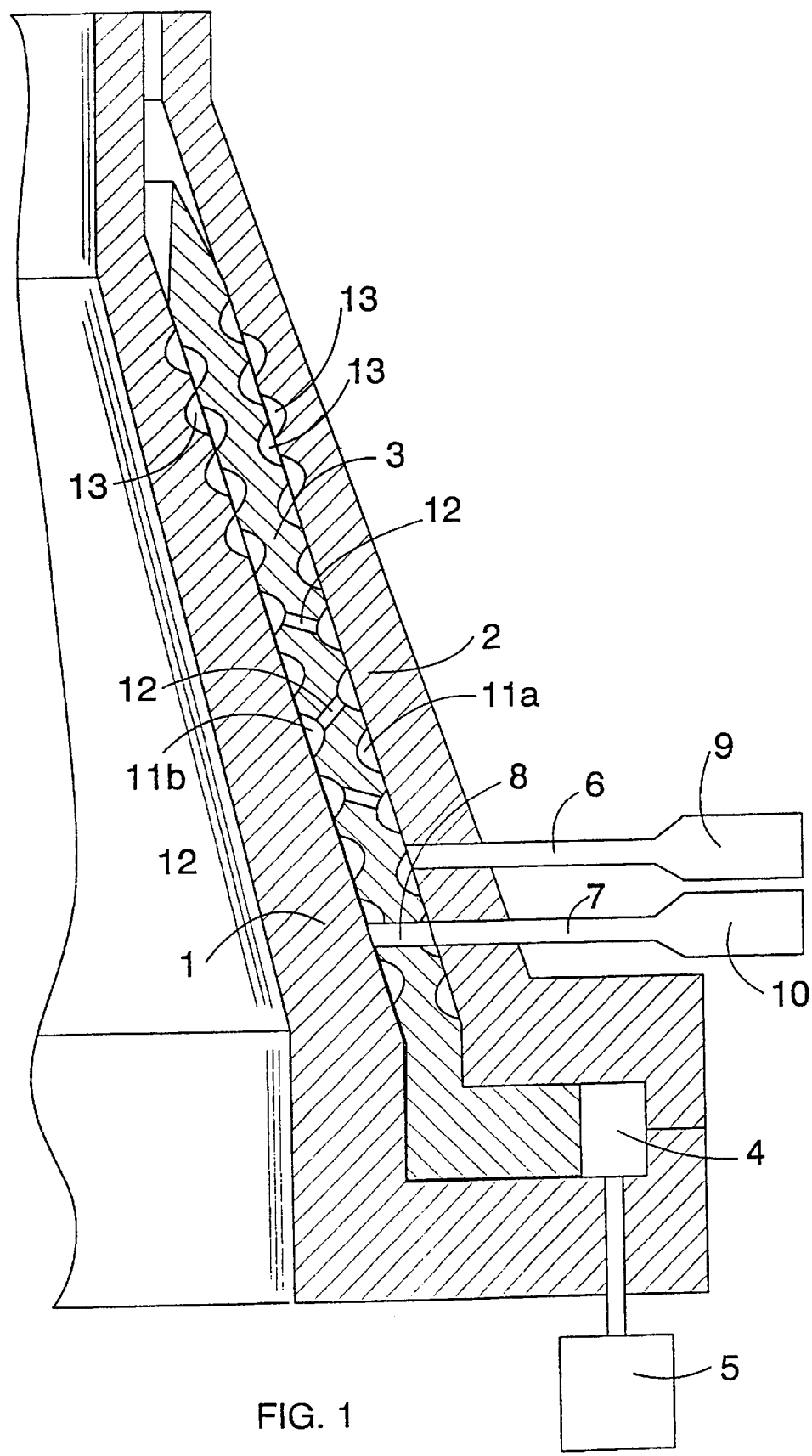

| | | |
|---|---|---|
| DE | 1092186 | 11/1960 |
| DE | 1097220 | 1/1961 |
| DE | 2051529 | 4/1971 |
| DE | 1961078 | 6/1971 |
| DE | 2519705 | 11/1976 |
| DE | 2659182 | 7/1977 |
| DE | 2821333 | 11/1978 |
| EP | 0199397 | 10/1986 |
| EP | 0358178 | 3/1990 |
| EP | 0410503 | 1/1991 |
| EP | 0581566 | 2/1994 |
| EP | 9067797 | 4/1994 |
| FI | 911293 | 3/1991 |
| GB | 848423 | 9/1960 |
| GB | 2202783 | 10/1988 |
| GB | 2245977 | 1/1992 |
| JP | 5827040 | 2/1983 |
| SU | 1384394 | 3/1988 |

\* cited by examiner

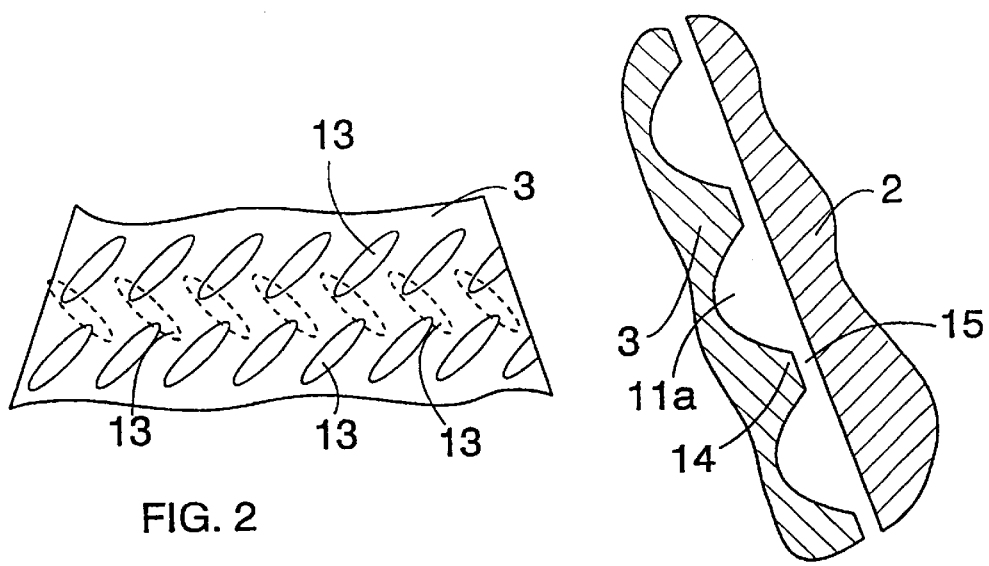
FIG. 2
FIG. 3
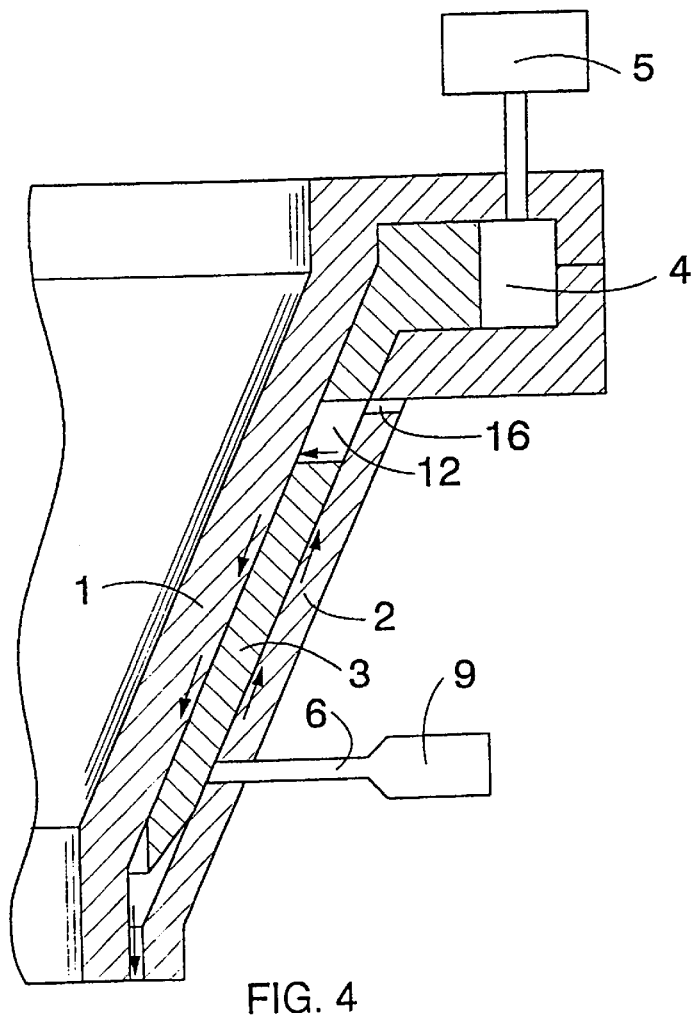
FIG. 4

METHOD OF PRODUCING HOMOGENEOUS MATERIAL WITH AN EXTRUDER, AN EXTRUDER, AND A MULTILAYER PLASTIC PIPE

This application is a divisional of copending application (s) application Ser. No. 09/077,902 filed on Jun. 4, 1998, now U.S. Pat. No. 6,073,657, which is a 371 of and International Application PCT/FI96/00658 filed on Dec. 12, 1996 and which designated the U.S., claims the benefit thereof and incorporates the same by reference.

The invention relates to a method for producing homogenous material with an extruder at least two annular conical feed gaps situated between a rotatable rotor and a stator so that the material to be extruded is supplied between the rotor and the stator.

The invention further relates to an extruder comprising at least two annular conical feed gaps situated between a rotatable rotor and a stator, and which comprises means for supplying the material to be extruded between the rotor and the stator.

The invention also relates to a multilayer plastic pipe comprising an inner and outer pipe and an intermediate layer formed of softer material and situated between the inner and outer pipe.

U.S. Pat. No. 3,314,108 discloses an extruder comprising two conical stators and a conical rotor that is placed rotatably between the stators. The plastic material to be extruded is supplied via two separate conduits to different sides of the rotor. The rotor is provided with screw-shaped grooves by means of which the material is transferred towards an orifice at the narrower end of the extruder. The intermixing of the materials to be fed via different conduits is prevented with seals at the end where the material is supplied, wherefore the materials situated on different sides of the rotor only come together after the rotor near the end of the extruder, wherefore the intermixing of the materials remains insignificant. Further, unequal pressures may easily occur on different sides of the rotor due to the feed rates of the separate material flows fed from different conduits, and the pressure difference stresses the rotor and may damage it.

European patent application 89 906 779.7 discloses an extruder comprising several conical stators, and conical rotors that are rotatably placed between the stators. The material to be extruded is supplied along one conduit to the beginning of each rotor, whereupon the inlet of the rotor comprises openings via which the material can also flow to the other side of the rotor. By means of grooves provided on each side of the rotor, the material is transferred towards the end of the extruder. Also in this apparatus, the material flows passing on different sides of the rotor come together only near the orifice, wherefore the materials situated on different sides do not intermix efficiently. Further, there may be a great difference in pressure on different sides of the rotor and it stresses the rotor and may damage it.

When multilayer pipes are prepared, the intermediate layer or layers are typically made less strong than the outer and inner layers, or less strong materials are commonly used in the intermediate layer compared to the outer and inner layers. The material of the intermediate layer is preferably for example waste plastic, since this arrangement decreases the pollution of the environment and is also very advantageous economically. Another alternative is the foaming of the plastic material of the intermediate layer, but the foaming can naturally also be performed on waste plastic. However, especially the use of waste plastic requires that the equipment to be used has better mixing and processing properties than usually. Also, it may be necessary to mix reinforcing fibres in the intermediate layer, and the even distribution of the fibres in this layer requires very efficient mixing.

The extrusion apparatuses for multilayer pipes that have been developed so far have not provided sufficient mixing of the intermediate layers in the aforementioned cases.

U.S. Pat. No. 4,364,882 discloses a conventional foamed pipe made of PVC. The PVC is foamed to the density of 500 $kg/m^3$, which in fact represents the minimum that can be achieved with the conventional technology. A typical foaming degree for PVC foam is 57%, in which case the density is 800 $kg/m^3$, since with lower values the strength properties of the PVC foam deteriorate rapidly. The patent discloses a pipe having an outer diameter of 315 mm and the following structure:

the inner pipe has a thickness of 1.25 mm, the intermediate layer has a thickness of 9 mm and the outer pipe 1.25 mm. The total thickness of the pipe is thus 11.5 mm, the total weight is 7.63 kg/m and the obtained saving in weight compared to a conventional pipe having corresponding rigidity is 29%.

As the above example shows, foamed plastic provides considerable saving in material (i.e. in costs) while producing a lighter pipe structure. The use of such "inferior" material as an intermediate layer is appropriate in this connection, since this layer is the least subjected to mechanical stresses, such as wearing and stress deformations, and to physical and chemical stresses, such as UV radiation and other impurities.

On the other hand, when the foaming degree of the intermediate layer is increased, i.e. the density is decreased, the properties of the foamed material also deteriorate significantly. Until now the maximum foaming degree used has been in practice such that it has decreased the density of the material into half of the density of unfoamed material, since after this level the strength of the foam deteriorates significantly, and the construction of a pipe with a strong structure has thus been considered impossible.

The above-described known multilayer pipes with a foamed intermediate layer have several disadvantageous properties, the most important of which is low impact resistance. The reasons for such poor mechanical strength include for example the poor homogenization of the plastic material.

The purpose of the present invention is to provide a method for producing homogenous material with an extruder, and an extruder in which the material supplied thereto can be mixed efficiently and which comprises none of the aforementioned problems.

Another purpose of the invention is to improve known multilayer pipes.

The method. according to the invention is characterized in that at least one rotor or stator comprises openings between the delivery point of the material to be extruded and the nozzle of the extruder in the direction of travel of the material, so that at least some of the material to be extruded can be made to flow through the openings.

Further, the extruder according to the invention is characterized in that at least one rotor or stator comprises openings between the delivery point of the material to be extruded and the nozzle of the extruder in the direction of travel of the material, at least some of the material to be extruded being able to flow through the openings.

Further, the multilayer pipe according to the invention is characterized in that at least one layer consists of fibre-containing solid or foamed reprocessed plastic.

The manufacture of the pipe utilizes the method and apparatus according to the invention.

The essential idea of the invention is that between the conical annular feed gaps there is a rotor or a stator comprising openings via which the material situated on different feed gaps can flow. Further, the idea of a preferred embodiment is that the rotor and the stators comprise oval notches that are positioned in such a way that they partly overlap so that in these notches the material supplied to the extruder can be mixed. The idea of another preferred embodiment is that several different agents are supplied to the extruder and they can be intermixed. The idea of a third preferred embodiment is that the material to be extruded is fed into the narrow end of the rotor, and the grooves of the rotor transport the material along the first side of the rotor to the wide end of the rotor where the material can enter the other side of the rotor via the openings provided in the rotor, whereafter the rotor grooves transport the material along the other side of the rotor and out via the nozzle of the exturder.

The invention has the advantage that the material to be supplied can be mixed efficiently, whereupon very homogenous material can be discharged from the extruder. A further advantage is that the openings provided in the rotor or stator between the feed gaps balance the pressures on different feed gaps, whereupon material can be supplied with different pressures to different feed gaps, for example. The advantage of another embodiment is that the oval notches provide even more efficient mixing of the material. By means of the invention, several different agents can be mixed and an efficiently blended homogenous mixture can be discharged from the extruder. By supplying the material to the narrow end. of the rotor, it is possible to provide a long mixing section, thus producing a very homogenous mixture. Further, it is possible to utilize the overheat generated during the final stage of the extrusion to melt the material supplied to the extruder. Another advantage is that the removal of gas and moisture from the material to be extruded can be arranged In the extruder at the point where the material is transferred via the openings in the rotor to the other side of the rotor.

Especially good mechanical properties of a multilayer plastic pipe are provided by the embodiment of the invention where the outer pipe and the inner pipe are reinforced by means of orientation and/or oriented fibres. Pipes that have been extruded in a conventional manner do not usually employ staple fibres for reinforcing the pipe mainly because during the extrusion the fibres are oriented according to the pipe axis and the reinforcing characteristic of the fibres is of no use. This concerns both pressure pipes and sewage pipes that require reinforcement in the circumferential direction. With certain techniques, such as rotating mandrels or rotating nozzles, the fibres can be oriented partly in the circumferential direction in the surface layers of the pipe by means of discontinuing the rotating motion. The use of this kind of defiberization in thermoplastic pipes for sewage is completely unknown due to the high costs of the process, for example. Fibre-containing masterbatch is typically about 3 to 4 times more expensive than conventional polyethylene. Adding fibres thus increases the price of the pipe, since the increased strength properties are not sufficient to compensate for the higher price of the raw material. According to the invention, it has surprisingly been found that the adding of fibres does produce a less. expensive final product than the conventional pipes. This is due to the fact that the reinforcing effect of the fibres is great in the layer that bears most of the load in the pipe according to the invention, i.e. in the inner and outer pipe, and for example in underground sewage and drainage pipes which are designed by using the ring rigidity as the criterion, the intermediate layer of the pipe is not used efficiently.

Figure 5:
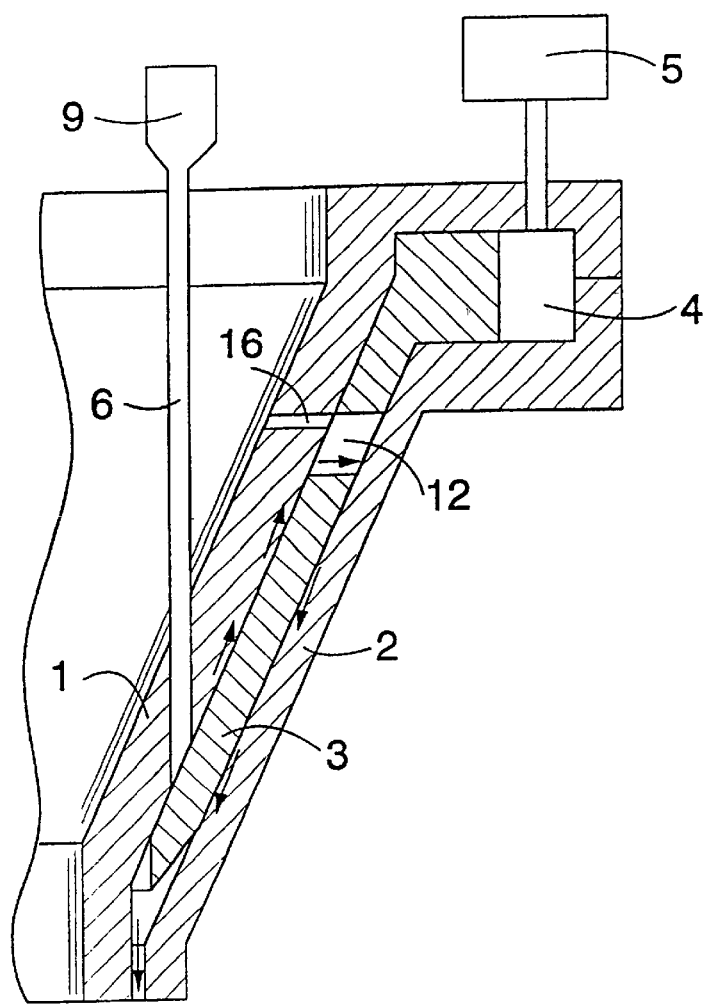
Figure 7:
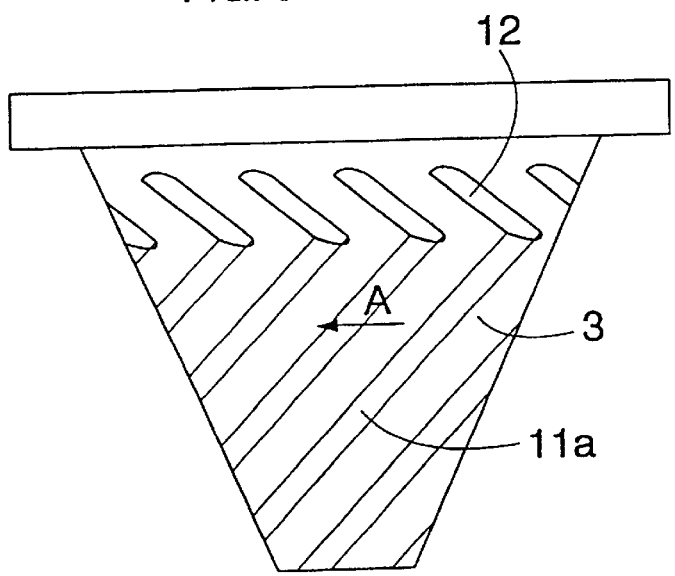
Figure 6:
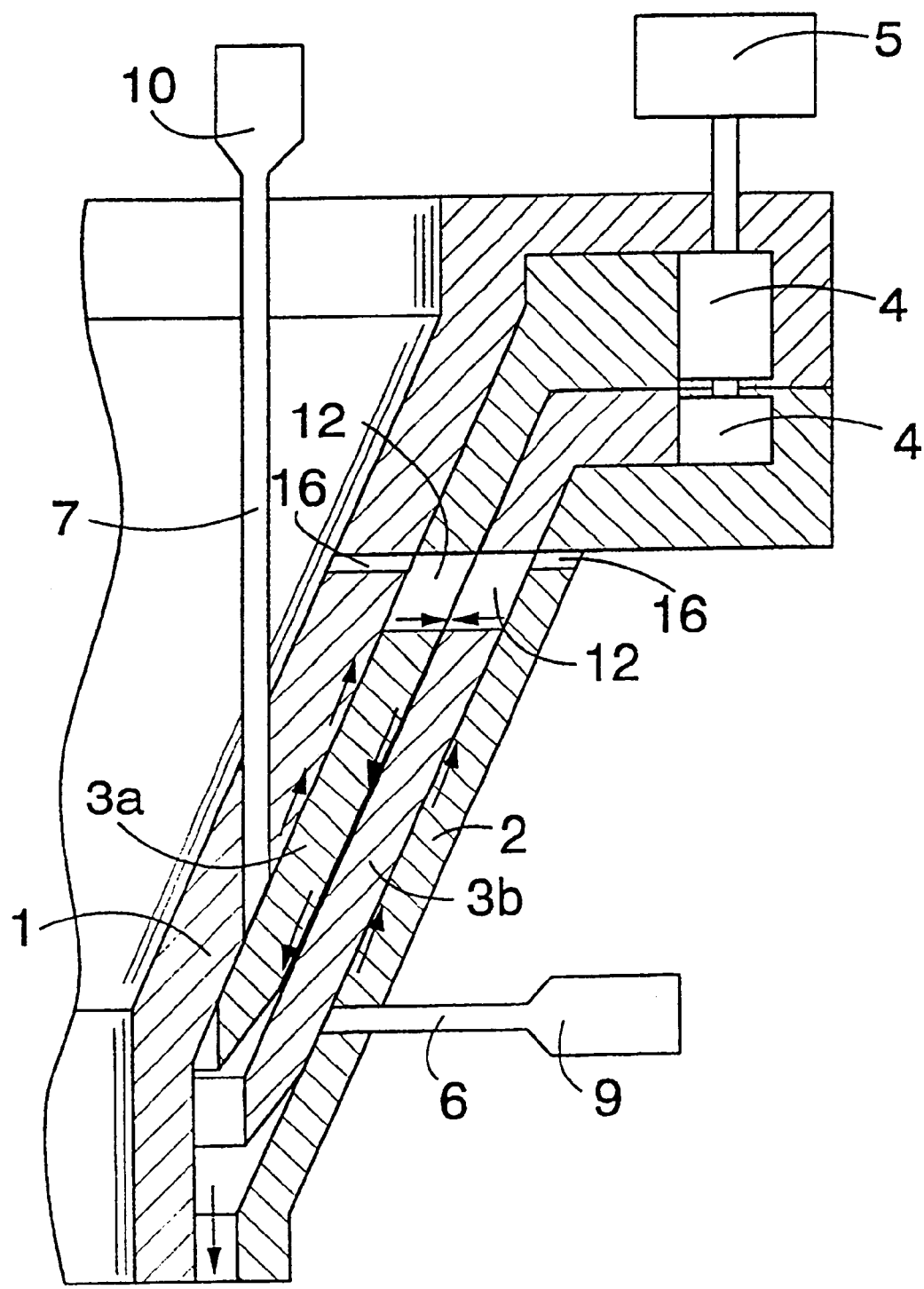
Figure 8:
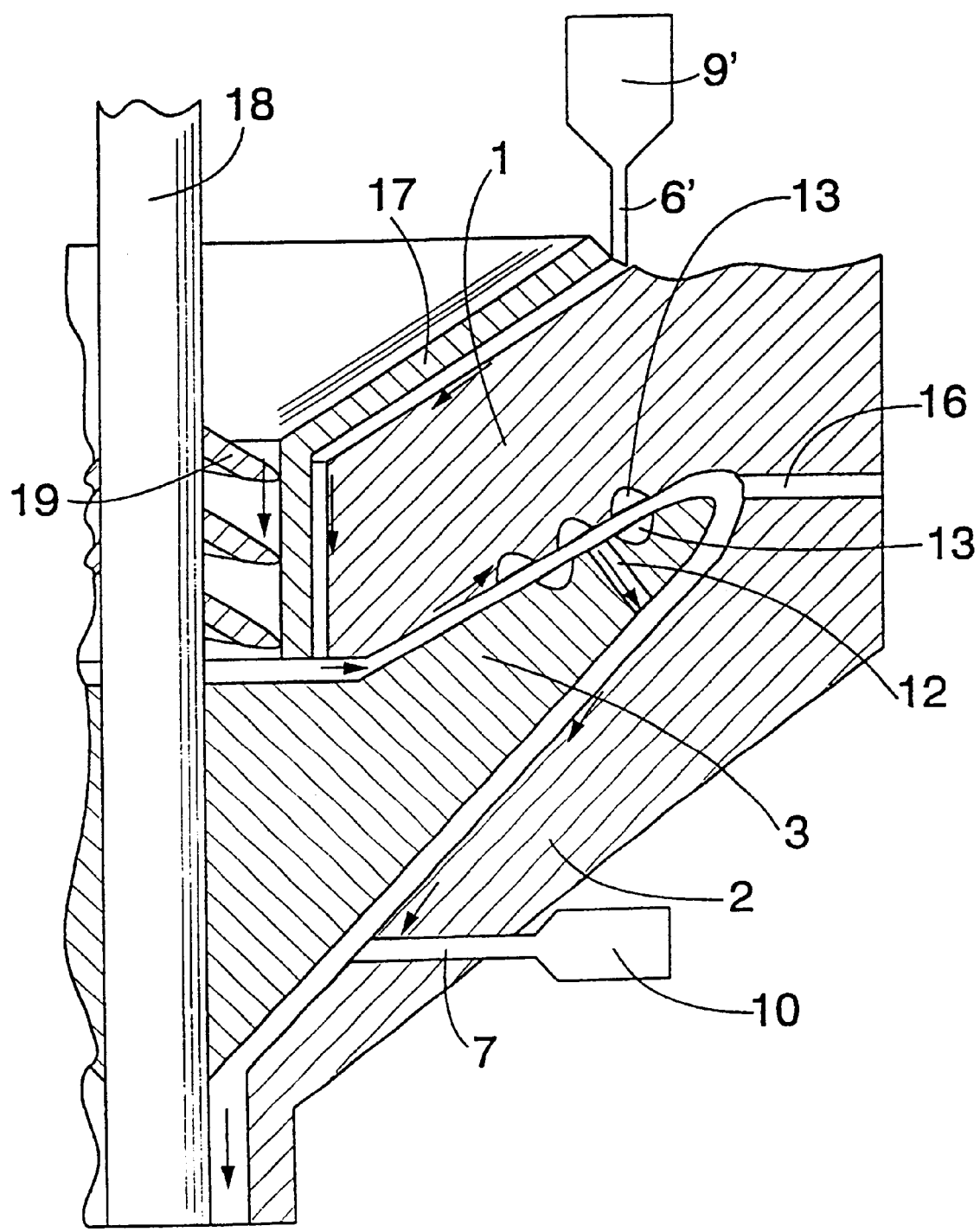
Figure 9:
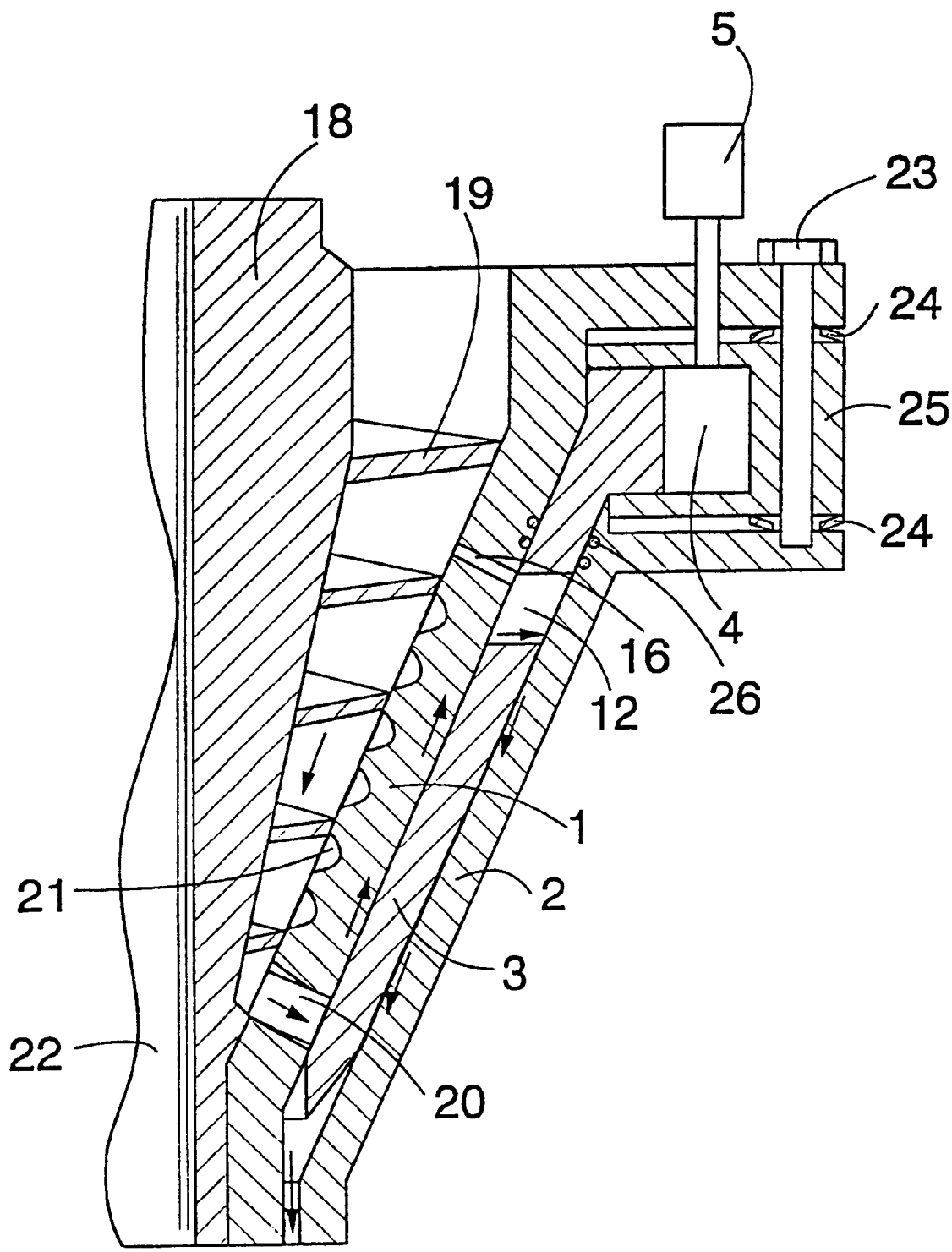
Figure 10:
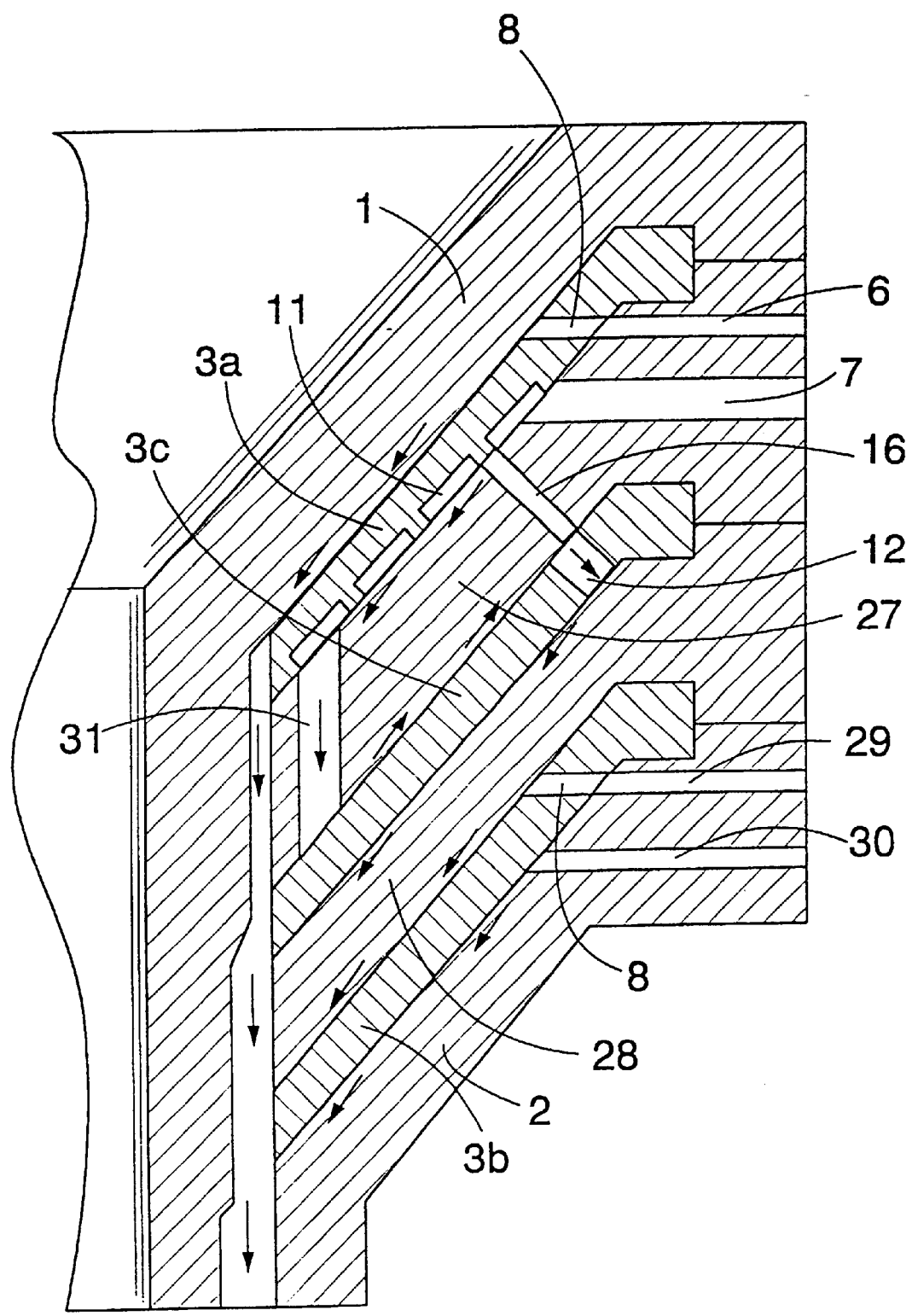
Figures 11, 12:
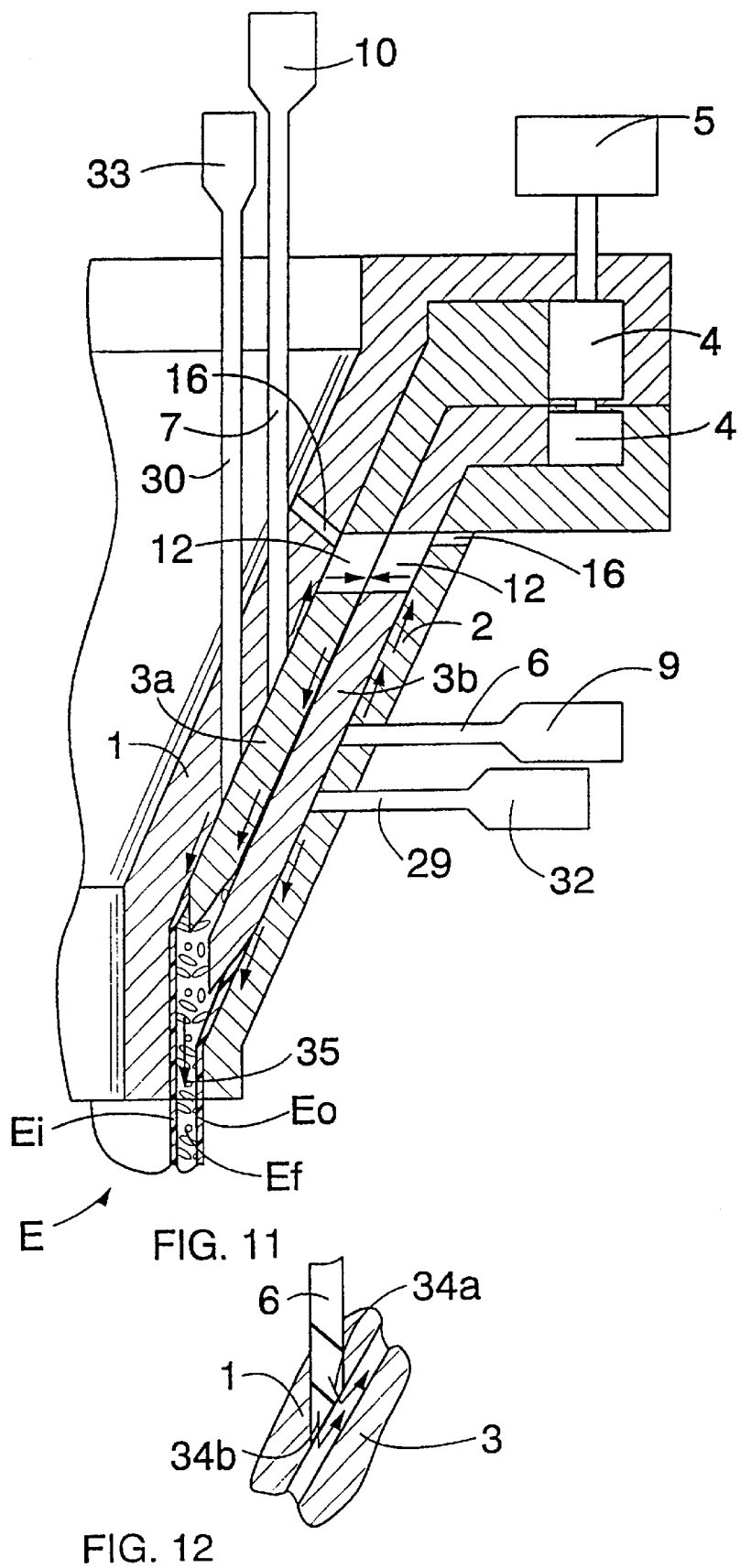

The invention will be described in greater detail in the accompanying drawings, in which FIG. 1 is a schematic side view, in cross-section, of an extruder according to the invention, FIG. 2 shows a part of a rotor in the extruder of FIG. 1, FIG. 3 shows a detail of the extruder of FIG. 1, FIG. 4 is a schematic side view, in cross-section, of a second extruder according to the invention, FIG. 5 is a schematic side view, in cross-section, of a third extruder according to the invention, FIG. 6 is a schematic side view, in cross-section, of a fourth extruder according to the invention, FIG. 7 is a side view of a rotor in the extruder of FIG. 4, FIG. 8 is a schematic side view, in cross-section, of a fifth embodiment of an extruder according to the invention, FIG. 9 is a schematic side view, in cross-section, of a sixth embodiment of an extruder according to the invention, FIG. 10 is a schematic side view, in cross-section, of a seventh embodiment of an extruder according to the invention, FIG. 11 is a schematic side view, in cross-section, of an eighth embodiment of an extruder according to the invention, and FIG. 12 shows a detail of a supply conduit in the extruder of FIG. 5.

FIG. 1 is a cross-sectional side view of an extruder according to the invention. The extruder comprises an inner stator 1 and an outer stator 2 placed outside the inner stator. At least the outer surface of the inner stator 1 and the inner surface of the outer stator 2 are conical. Between the inner stator 1 and the outer stator 2 there is a conical rotor 3. Then there is an annular conical feed gap on both sides of the rotor 3. The rotor 3 is adapted to move rotatably between the inner stator 1 and the outer stator 2. The rotor 3 is rotated by a motor 5. The motor 5 may be for example a hydraulic motor, an electric motor or some other motor that is known per se and that is suitable for the purpose. The motor 5 is adapted to rotate the rotor 3 through a gear system 4. The speed of rotation of the rotor 3 can be adjusted in a desired manner by means of the gear system 4. On the other hand, for example when an electric motor is used, the gear system 4 is not necessary, since the rotational frequency of the rotor 3 can be adjusted easily by regulating the rotational speed of the motor 5 in a manner known per se. The above-described components of the extruder are known per se, wherefore they have not been discussed in greater detail in this connection.

The extruder further comprises a first supply conduit 6 along which the material to be extruded can be fed into the exterior of the rotor 3 between the rotor 3 and the outer stator 2. The extruder also comprises a second supply conduit 7 along which material can be fed into the interior of the rotor 3 between the rotor 3 and the inner stator 1 via an opening or openings 8 provided in the rotor 3. The material to be fed into the first supply conduit 6 is supplied with a first feeding device 9. Correspondingly, for the purpose of feeding materials into the second supply conduit 7, the arrangement comprises a second feeding device 10. The feeding devices 9 and 10 can be for example feed screws, pumps or some other devices known per se. With this feeding device, the flow rate of the material to be fed into the supply conduit can be adjusted.

The rotor 3 comprises on the outside outer grooves 11*a* and on the inside inner grooves 11*b*. The grooves 11*a* and 11*b* are screw-shaped, whereupon during the rotation of the rotor 3 the grooves 11*a* and 11*b* transport the material to be extruded towards the nozzle section of the extruder. The rotor 3 further comprises openings 12 via which the material to be extruded can flow from the exterior of the rotor 3 into its interior and vice versa. Therefore the materials situated on the outside and inside of the rotor 3 can be intermixed already inside the rotor 3, whereupon the result is a well mixed material. The stators 1 and 2 further comprise notches 13, whereupon as the material to be extruded arrives at the notches 13, its flow does not continue towards the nozzle of the extruder as evenly as before, but at these notches the material is mixed further. At the notches 13 there are also corresponding notches in the rotor 3. The notches 13 are made so large and placed at such intervals from one another that the notches of the rotor 3 and the stators 1 and 2 overlap at least partly.

FIG. 2 shows a part of the rotor of the extruder of FIG. 1. The reference numerals in FIG. 2 correspond to those in FIG. 1. The notches 13 of the rotor 3 are oval in shape and they are placed diagonally in such a way that as the rotor 3 rotates, the notches 13 transport the material to be extruded towards the nozzle of the extruder. Some of the corresponding notches 13 of the stator are denoted with a broken line. The notches 13 of the rotor 3 and the stator are positioned diagonally in opposite directions and they overlap partly, so that the material is mixed efficiently in the notches 13.

FIG. 3 shows a detail which includes a part of the rotor 3 and a part of the outer stator 2. The reference numerals in FIG. 3 correspond to those in FIGS. 1 and 2. The rotor 3 and the outer stator 2 are spaced in such a way that there remains a gap 15 between the necks 14 situated between the outer grooves 11a of the rotor 3, and the outer stator 2. In such a case, the outer grooves 11a transport the material to be extruded upwards as seen in the figure, but some of the material can flow downwards in the figure through the gap 15, whereupon the mixing of the materials is improved further. There may naturally be a similar gap between the rotor 3 and the inner stator 1.

FIG. 4 shows a second extruder according to the invention. The reference numerals in FIG. 4 correspond to those in FIGS. 1 to 3. The supply conduit 6 and the feeding device 9 connected thereto are placed at the narrower end of the rotor 3. The grooves of the rotor 3 are placed in such a way that as the rotor 3 rotates, the grooves transport the material to be supplied between the rotor 3 and the outer stator 2 upwards in the figure. When the material arrives at the openings 12, it can flow to the interior of the rotor 3 via the openings 12, and the inner grooves of the rotor 3 are arranged to press the material to be extruded downwards as seen in the figure. The movement of the material to be extruded is illustrated by arrows in FIG. 4. For the sake of clarity, FIG. 4 does not show the rotor grooves nor the possible notches of the stators and the rotor. The grooves transporting the material may be situated to the stator as well. Preferably the grooves and the openings 12 should be constructed in such a manner that at each moment as the rotor rotates the sum of the areas of the rotor openings 12 visible at the end of the groove remains substantially constant. Then the material transported by the grooves can flow evenly from the grooves via the rotor opening 12, whereupon there will be no pumping effect in the flow of material. When the material to be extruded is pressed outwards between the rotor 3 and the outer stator 2, it is subjected to pressure. When the material thereafter arrives at the openings 12, the pressure acting on the material is removed, and gases and moisture possibly found in the material can be removed via a discharge outlet 16. The discharge outlet 16 can be made to pass through the outer stator 2, as shown in FIG. 4, or through the inner stator 1, whereupon the means for removing moisture and gas can be preferably placed inside the extruder. There may be more than one supply conduit 6 and feeding device 9, whereupon different feeding devices 9 can be used to supply for example different materials from different places or the flow of the material to be supplied to the extruder can be balanced in some other manner, if desired. The arrangement of FIG. 4 makes it possible to increase the distance the material to be extruded travels in the extruder, whereupon the mixing of the material can be implemented effectively. As the material to be supplied travels upwards between the rotor 3 and the outer stator 2, the friction generates heat which is transmitted through the rotor 3 to warm the material between the rotor 3 and the inner stator 1. Therefore this heat that would normally be cooled and thus completely wasted can be utilized efficiently.

FIG. 5 is a side view, in cross-section, of a third extruder according to the invention. The reference numerals in FIG. 5 correspond to those in FIGS. 1 to 4. In the extruder of FIG. 5, a supply conduit/conduits 6 and correspondingly a feeding device/devices 9 are positioned from inside the extruder through the inner stator 1 to supply the material to be extruded between the inner stator 1 and the rotor 3. The rotor 3 grooves must naturally be placed in such a way that as the rotor 3 rotates, the material to be extruded is first transported upwards, as seen in the figure, between the inner stator 1 and the rotor 3, and after it has passed through the opening 12 to the outside of the rotor 3, the material is transferred downwards in the figure between the rotor 3 and the outer stator 2, as shown with arrows in FIG. 5. By positioning the supply conduit(s) 6 from the inside of the extruder, the structure of the extruder can be made compact. Further, the overheat generated during the extrusion can thus be utilized for preheating, in the supply conduit 6, the material to be supplied.

FIG. 6 is a side view, in cross-section, of a fourth extruder according to the invention. The reference numerals in FIG. 6 correspond to those in FIGS. 1 to 5. The extruder according to FIG. 6 comprises two rotors, an inner rotor 3a and an outer rotor 3b. The gear system 4 is positioned in such a way that by means of the system the inner rotor 3a is rotated in a different direction than the outer rotor 3b. The grooves of the rotors 3a and 3b are placed in such a way that the grooves of the outer rotor 3b transport the material to be supplied by the first feeding device 9 via the first supply conduit 6 between the outer rotor 3b and the outer stator 2 upwards as seen in the figure. Correspondingly, the grooves of the inner rotor 3a transport the material to be supplied by the second feeding device 10 via the second supply conduit 7 between the inner rotor 3a and the inner stator 1 upwards in the figure. When the material arrives at the openings 12, it passes through the openings 12 into the space between the inner rotor 3a and the outer rotor 3b. The outer grooves of the inner rotor 3a and correspondingly the inner grooves of the outer rotor 3b are positioned in such a way that the material between the rotors 3a and 3b moves downwards as seen in the figure by the action of the grooves and further out via the nozzle of the extruder. The movement of the materials is described with arrows in the accompanying figure. The materials to be supplied to different sides of the rotors 3a and 3b thus come together between the rotors 3a and 3b, whereupon they are efficiently intermixed. There may naturally be an intermediate stator between the inner rotor 3a and the outer rotor 3b, so that the materials flow separately between the inner rotor 3a and the intermediate stator and between the outer rotor 3b and the intermediate stator, and they only come together after the intermediate stator.

FIG. 7 is a side view of the rotor 3 in the extruder of FIG. 4. The reference numerals in FIG. 7 correspond to those in FIGS. 1 to 6. The direction of rotation of the rotor 3 is shown by the arrow A. The outer grooves 11a of the rotor 3 thus transport the material to be extruded upwards as seen in the figure. The upper parts of the grooves 11a are made to end at the openings 12, whereupon the material is transferred via the openings 12 to the interior of the rotor 3. The number of the openings 12 must be at least equal to that of the outer grooves 11a. Since the rotor 3 is positioned with its wider end upwards, the material to be extruded remains at the lower part of the opening 12, wherefore discharge outlets 16 can be placed at the upper parts of the openings 12 for discharging gas and moisture.

FIG. 8 is a side view, in cross-section, of a fifth extruder according to the invention. The reference numerals in FIG. 8 correspond to those in FIGS. 1 to 7. The extruder of FIG. 8 comprises a conical feed rotor 17 that is rotated by a rotating shaft 18. The rotating shaft 18 is also connected to a feed screw 19 by means of which the material supplied inside the feed rotor can be fed into the interior of the extruder. The extruder also comprises a supply conduit 6' into which a second material to be supplied is fed by a feeding device 9'. The surface of the feed rotor 17 situated on the side of the inner stator comprises grooves, whereupon as the feed rotor 17 rotates, the grooves transport the second material to be supplied from the supply conduit 6' to the interior of the extruder. The grooves of the feed rotor 17 are not shown in FIG. 8 for the sake of clarity. The first material that is supplied to the feed rotor 17 can be for example a filling agent, and the material supplied from the supply conduit 6' can be for example plastic. The feed screw 19 can be made easily changeable, so that the amount of filling agent supplied can be adjusted by the screw according to the desired proportion of filling agent. As the plastic supplied from the supply conduit 6' travels between the feed rotor 17 and the inner stator 1, the friction generates heat that warms the material inside the feed rotor 17. This feed rotor 17 arrangement prevents the hanging up of the material situated inside the rotor. The materials to be supplied come together near the central shaft 19 from where they are conducted by means of the grooves provided in the rotor 3 upwards in FIG. 7 in the manner shown by the arrows in the figure between the rotor 3 and the inner stator 1. The rotor 3 grooves are not shown in FIG. 7 for the sake of clarity. The rotor 3 and the inner stator 1 may comprise notches 13 for improving the mixing of the material. At least a part of the material can pass through the openings 12 provided in the rotor 3 to the space between the rotor 3 and the outer stator 2. Either all the material can be made to pass through the openings 12 or a part of the material may circulate around the upper end of the rotor 3 as shown in FIG. 7 to the space between the rotor 3 and the outer stator 2. The heat generated by the friction resulting from the grinding of the material between the feed rotor 17 and the inner stator 1 is also transmitted through the inner stator 1 to warm the mixing section situated between the rotor 3 and the inner stator 1. The extruder further comprises a second supply conduit 7 and a second feeding device 10 along which conduit 7 material can be fed between the rotor 3 and the outer stator 2 near the nozzle of the extruder. The material can be for example additive that can't stand a too long residence time caused for example by notches 13. The material can be for example masterbatch type plastic that contains for example peroxide whereby the material is very sensitive to higher temperature.

FIG. 9 is a side view, in cross-section, of a sixth extruder according to the invention. The reference numerals in FIG. 9 correspond to those in FIGS. 1 to 8. The extruder of FIG. 9 comprises a rotating shaft 18 that is arranged to rotate the feed screw 19 by means of which material can be supplied to the interior of the extruder. From the lower end of the feed screw 19 the material can flow between the rotor 3 and the inner stator 1 via an opening 20 provided in the inner stator 1. In connection with the feed screw 19 there is a force-feed spiral 21 having a thread that is opposite in direction to the threads of the feed screw 19. In such a case, the force-feed spiral creates a pressure in the material to be supplied, whereupon the material can be forced downwards in the figure with the freed screw 19. In the middle of the rotating shaft 18 there is a duct 22 so that the extruder can also be used for coating cables, for example.

The rotor 3 is mounted in bearings into the gearing frame 25. The gearing frame 25 is connected to the stators 1 and 2 with a fastening bolt 23. Between the gearing frame 25 and the stators 1 and 2 there are spring means, for example plate springs 24, so that the gearing frame 25 and therefore also the rotor 3 can move to some extent in the axial direction of the exturder with respect to the stators 1 and 2. If for example the pressure between the rotor 3 and the inner stator 1 increases, the plate springs 24 situated on the opposite side yield, so that the gap between the inner stator 1 and the rotor 3 grows and the friction increases. In such a case, the material warms up and simultaneously becomes softer, whereupon the pressure decreases and the gap between the rotor 3 and the inner stator 1 is correspondingly reduced. When the pressure between the rotor 3 and the outer stator 2 increases, the result is naturally opposite. Therefore this arrangement provides a self-adjusting gap. FIG. 9 also shows seals 26 that prevent the material to be supplied from entering the rotating mechanism of the rotor 3.

The discharge outlet 16 is arranged to conduct gases and moisture out via the material to be fed with the feed screw 19. If the opening 12 is filled by the material to be extruded to such an extent that some of the material can enter the discharge outlet 16, this is not harmful since the material can be conducted along the discharge outlet 16 back to the material to be supplied.

The rotor 3 grooves that transport the material to be extruded upwards inside the rotor 3 as seen in FIG. 9 and downwards outside the rotor 3 as shown in FIG. 9 according to the arrows are not depicted in FIG. 9 for the sake of clarity. The steepness of the grooves determines how sharply the corners of the grooves grind the material passing through the opening 20.

FIG. 10 is a side view, in cross-section, of a seventh extruder according to the invention. The reference numerals in FIG. 10 correspond to those in FIGS. 1 to 9. The extruder of FIG. 10 comprises three rotors: an inner rotor 3a, an outer rotor 3b and an intermediate rotor 3c. The rotating means of the rotors are not shown in the figure for the sake of clarity. Between the inner rotor 3a and the intermediate rotor 3c there is a first intermediate stator 27, and between the outer rotor 3b and the intermediate rotor 3c there is a second intermediate stator 28. Material is supplied along the first supply conduit 6 between the inner rotor 3a and the inner stator 1. The material forms the innermost layer of the product to be extruded, i.e. a so-called inner skin. Material is supplied along the second supply conduit 7 between the inner rotor 3a and the first intermediate stator 27. This material can be for example reprocessed plastic. Material is fed along the third supply conduit 29 between the outer rotor 3b and the second intermediate stator 28. The material can be for example adhesion plastic. Material is supplied along the fourth supply conduit 30 between the outer rotor 3b and the outer stator 2. The material forms the outer layer of the product to be extruded, i.e. a so-called outer skin. The reprocessed plastic to be supplied along the second supply conduit 7 has often coarse and uneven granulation, whereupon the grooves 11 of the inner rotor 3a can be made relatively large, if necessary, so that the material that is difficult to process can be transported forward by means of the rotor 3a. The material is first transported between the inner rotor 3a and the first intermediate stator 27 towards the narrower end of the inner rotor 3a where the material is passed via an aperture 31 through the intermediate stator 27 between the intermediate rotor 3c and the first intermediate stator 27. The grooves situated inside the intermediate rotor 3c are arranged to conduct the material towards the wider end of the intermediate rotor 3c where the material can flow via the opening 12 to the exterior of the intermediate rotor 3c and further out from the nozzle of the extruder. FIG. 10 does not show the grooves of the rotors 3a to 3c for the sake of clarity, except for the grooves 11 situated outside the inner rotor 3a. The passage of the materials to be supplied is clarified by means of arrows in FIG. 10. The discharge of gas and moisture via the discharge outlet 16 is arranged to pass out through the first intermediate stator 27 and via the material to be supplied along the second supply conduit 7 between the inner rotor 3a and the first intermediate stator 27. Preferably can the properties of the well-mixed plastic be improved by chemical cross linking using for example peroxides or azocompounds. In that case the product will not be cross-linked until after the extrusion. The strength of this kind of homogenous material with filling agent is essentially better than the strength of a cross-linked material not containing filling agent. Typically cross-linked plastics have very high molar mass whereby the mixing of filling agents is very difficult. However by using the method and apparatus according to the invention the mixing could be made. Typically the degree of cross linking in pipes used as hot water pipes should be very high. However when using reprocessed plastic the degree of cross-linking don't have to be that high.

FIG. 11 is a side view, in cross-section, of an eighth extruder according to the invention. The reference numerals in FIG. 11 correspond to those of FIGS. 1 to 10. In the extruder of FIG. 11, material is supplied via the first supply conduit 6 and the third supply conduit 29 between the outer stator 2 and the outer rotor 3b. Correspondingly, the second supply conduit 7 and the fourth supply conduit 30 supply the material to be extruded to the space between the inner stator 1 and the inner rotor 3a. The material is naturally supplied to the third supply conduit with a third feeding device 32 and to the fourth supply conduit with a fourth feeding device 33. The grooves provided on the outside of the outer rotor 3b are placed in such a way that the material to be supplied from the first supply conduit 6 is conducted upwards as seen in FIG. 11 towards the wider end of the outer rotor 3b. The material to be fed along the third supply conduit 29 is conducted with opposite grooves towards the nozzle of the extruder. Correspondingly, the material to be fed along the second supply conduit 7 is first conducted towards the wider end of the inner rotor 3a, and the material to be supplied along the fourth supply conduit 30 is conducted towards the nozzle of the extruder. For the sake of clarity, the grooves of the rotors 3a and 3b are not shown in the figure, but the directions of travel of the material are shown with arrows. With this arrangement, the outer skin of the product to be extruded, i.e. the outer pipe Eo, can be supplied along the supply conduit 29, and the material to be fed along the fourth supply conduit 30 can be formed into the inner skin of the product, i.e. the inner pipe Ei. The materials supplied along the first supply conduit 6 and the second supply conduit 7 can be mixed very efficiently and they form the intermediate layer Ef. In the case of FIG. 11, the outer pipe Eo, the inner pipe Ei and the intermediate layer Ef are formed in one and the same thermic unit, which results in smaller losses and lower costs than previously.

The outlet end of the extruder comprises a central annular extrusion conduit 35 for discharged plastic material, i.e. a plastic pipe preform E. The opposite surfaces of the rotors 3a and 3b comprise spiral grooves that are positioned crosswise with respect to each other, i.e. they are differently handed. By means of the grooves, the plastic material supplied between the rotors can be foamed very effectively. If the plastic is waste plastic, it can also be simultaneously processed and mixed vigorously. When the plastic is waste plastic, it is also possible to mix reinforcing fibres therein, if desired.

The extruder also comprises means for spraying gas in the space between the rotors 3a and 3b. The means are not shown in the figure for the sake of clarity. The gas may be for example nitrogen or carbon dioxide. The gas is sprayed in a point where the plastic material has substantially already melted and the gas is mixed with the plastic material.

The multilayer plastic pipe E according to the invention shown in FIG. 11 comprises an inner pipe Ei, an outer pipe Eo and an intermediate layer Ef made of foamed plastic.

The foaming of the plastic material can be improved by adding thereto at most about 1 of chemical foaming agent. It is also possible to add staple fibres, which can be placed in an angular position deviating from the central axis of the pipe, in the plastic material forming the inner and outer pipe and possibly also the intermediate layer. It should be noted that it is not possible to circulate with conventional extruders polypropylene that is reinforced with glass and that is used widely for example in car industry to be used in pipe arrangements, since in these extruders the fibres are oriented along the pipe axis, so that the impact resistance properties of the pipe deteriorate. In order to avoid this drawback, it has previously been necessary to separate the fibres from the matrix or to grind them into almost round fillers. A possible alternative or complementary process to the use of staple fibres or fibre-like fillers is the orientation of the plastic material of the inner and/or outer pipe with the method according to the present invention.

At least one layer (either the inner pipe Ei, the outer pipe Eo or the intermediate layer Ef) consists of fibre-containing solid or foamed plastic. The plastic can be any extrudable polymer. It has surprisingly been found that a very good pipe can be manufactured from a mixture of polypropylene and wollastonite that comprises about 20% by weight of wollastonite. When this material mixture is foamed into an intermediate layer, the result is a foamed pipe that is stronger than usual. The fibre-like mineral particles of wollastonite probably reinforce the foam optimally. When recycled materials are used, the plastic may be polypropylene that contains glass fibres and it may also contain rubber that is obtained from the reclaiming of car tyres. The reprocessed plastic may also contain fibering compatibilizer plastic, such as liquid crystalline polymer LCP. The solid outer surfaces and/or the intermediate layer Ef that is formed of fibre-containing reprocessed plastic preferably comprise a diagonal orientation field. As reinforcement can also be used recycled cross-linked plastics or fibres if they are first grinded into powder before extruding them with the matrix plastic.

The inner pipe Ei may also be made of medium-density polyethylene (MDPE) of pressure pipe quality, or of some other thermoplastic or thermosetting plastic. The density is typically 940 kg/m³ and the wall thickness is 1 to 5 mm, most suitably 2 to 3 mm.

The outer pipe Eo may correspondingly be made of high-density polyethylene (HDPE) intended for example for blow moulding and having a density of about 955 kg/m³ and a wall thickness that substantially equals the wall thickness of the inner pipe Ei.

The density of the intermediate layer Ef is considerably lower than that of the inner and outer pipe Ei, Eo and the wall thickness is typically 5 to 20 mm, preferably about 10 mm. An extremely good product is obtained when the intermediate layer consists of cross-linked polyethylene or a mixture thereof. The weight of the foamed layer is typically over 50% of the mass of the entire pipe. Even though the foaming degree were high, the foam containing oriented fibres provides excellent strength properties. With the method according to the invention, it is also possible to prepare foamed pipes where the weight percentage of the foamed layer of the entire mass of the pipe is substantially smaller, without the economy of the pipe deteriorating.

Especially the inner pipe Ei, but possibly also the outer pipe Eo, is reinforced with fillers or fibre-like reinforcements and/or the preparation material of the pipe is oriented. The pipe has very great impact strength if the inner and/or outer pipe are made of oriented thermoplastic which comprises as reinforcement broken glass fibres that are not oriented in the axial direction of the pipe.

It is also preferable that the inner pipe Ei is made of either non-pigmented or lightly pigmented plastic, whereupon possible damages can be easily located by means of a video check. The outer pipe Ei has preferably been UV-stabilized, normally by pigmenting it black, so that the pipe stands well for example storing outside, and the soot black colour also increases the impact resistance of the outer pipe.

It has been observed that solid state grinded PEX is very efficient reinforcer because of its platelike or fibrelike characteristics. Mica is also very efficient platelike reinforcer acting at the same time as axial reinforcer and as barrier layer. Therefore an advantageous pressure pipe could be made by making the inner pipe Ei of cross-linked PE and the intermediate layer Ef of polyolefin reinforced with mica.

FIG. 12 shows a detail of the end of the supply conduit. The reference numerals in FIG. 12 correspond to those in FIGS. 1 to 11. The supply conduit 6 is formed in such a way that the material to be supplied is divided in the supply conduit 6 into two different material flows 34a and 34b. The material flows 34a and 34b are supplied to different places according to FIG. 12, thus avoiding the agglomeration of the materials.

The drawings and the description related thereto are only intended to illustrate the inventive idea. The details of the invention may vary within the scope of the claims. Therefore it is possible to use for example only one stator outside of which there is a rotor and inside of which there is also another rotor whereby for example referring to FIG. 1 reference numeral 1 would be a stator and means referred with reference numerals 2 and 3 would be rotors. Essential to the invention is however that there is at least two annular conical feed gaps.

What is claimed is:

1. An extruded multilayer plastic pipe comprising an inner layer, an outer layer and an intermediate layer, wherein each of said inner and outer layers is comprised of a thermoplastic material, the intermediate layer consisting essentially of a lower density material than said inner and outer layers, and said intermediate layer being situated between and abutting both the inner layer and the outer layer, and a least one of said inner, outer and intermediate layers consisting of reinforced solid or foamed reprocessed plastic, at least one of said inner, outer and intermediate layers comprising a plastic matrix and a reinforcement, said plastic matrix and reinforcement being extrudable together and forming at least one of the inner, outer and intermediate layers as a reinforced solid or foamed reprocessed plastic with the reinforcement extruded with and contained within the plastic matrix.

2. A plastic pipe according to claim 1, wherein the thickness of the intermediate layer is greater than the thickness of the inner layer and the thickness of the outer layer.

3. A plastic pipe according to claim 1, wherein the reprocessed plastic contains rubber obtained from the reclaiming of car tires.

4. A plastic pipe according to claim 1, wherein fibering compatibilizer plastic is mixed in the reprocessed plastic.

5. A plastic pipe according to claim 4, in which the fibering compatibilizer plastic is LCP plastic.

6. A plastic pipe according to claim 1, wherein the at least one layer is formed of fiber-containing reprocessed plastic comprising a diagonal orientation field.

7. A plastic pipe according to claim 6, in which the fiber-containing reprocessed plastic is polypropylene which is enforced with glass fibers.

8. A plastic pipe according to claim 1, wherein the outer and/or inner layer comprise staple fibers or wollastonite the orientation of which differs from the axial direction.

9. A plastic pipe according to claim 1, wherein at least one layer is cross-linked.

10. A plastic pipe according to claim 1, wherein the reinforcement consists of recycled cross-linked plastic or fibers.

11. A plastic pipe according to claim 1, wherein the inner layer is formed of cross-linked polyethylene and the intermediate layer is formed of polyolefin reinforced with mica.

12. A plastic pipe according to claim 1, wherein the reinforcement consists of staple fibers.

13. A plastic pipe according to claim 1, wherein the intermediate layer comprises reinforced plastic, the reinforcement consisting of staple fibers.

14. A plastic pipe according to claim 1, wherein the intermediate layer comprises reinforced plastic, the reinforcement consisting of staple fibers and rubber.

15. A plastic pipe according to claim 1, wherein the intermediate layer is a homogenous material comprising reinforced plastic.

16. An extruded multilayer plastic pipe comprising an inner layer, an outer layer and an intermediate layer, the intermediate layer consisting essentially of a lower density of material than said inner and outer layers and said intermediate layer being situated between and abutting both the inner layer and the outer layer and at least one of said inner, outer and intermediate layers consisting of reinforced solid or foamed reprocessed plastic, the reprocessed plastic containing rubber obtained from the reclaiming of car tires, at least one of said inner, outer and intermediate layers comprising a plastic matrix and a reinforcement, said plastic matrix and reinforcement being extrudable together and forming at least one of the inner, outer and intermediate layers as a reinforced solid or foamed reprocessed plastic with the reinforcement extruded with and contained within the plastic matrix.

17. A plastic pipe according to claim 16, wherein the thickness of the intermediate layer is greater than the thickness of the inner layer and the thickness of the outer layer.

18. A plastic pipe according to claim 16, wherein fibering compatibilizer plastic is mixed in the reprocessed plastic.

19. A plastic pipe according to claim 18, in which the fibering compatibilizer plastic is LCP plastic.

20. A plastic pipe according to claim 16, wherein the at least one layer is formed of fiber-containing reprocessed plastic comprising a diagonal orientation field.

21. A plastic pipe according to claim 20, in which the fiber-containing reprocessed plastic is polypropylene which is enforced with glass fibers.

22. A plastic pipe according to claim 16, wherein the outer and/or inner layer comprise staple fibers or wollastonite the orientation of which differs from the axial direction.

23. A plastic pipe according to claim 16, wherein at least one layer is cross-linked.

24. A plastic pipe according to claim 16, wherein the reinforcement consists of recycled cross-linked plastic or fibers.

25. A multilayer plastic pipe according to claim 16, wherein the inner layer is formed of cross-linked polyethylene and the intermediate layer is formed of polyolefin reinforced with mica.

26. An extruded multilayer plastic pipe comprising an inner layer, an outer layer and an intermediate layer, wherein each of said inner and outer layers is comprised of a thermoplastic material, the intermediate layer being formed of softer material and said intermediate layer being situated between and abutting both the inner layer and the outer layer, and at least one of said inner, outer and intermediate layers consisting of reinforced solid or foamed reprocessed plastic, at least one of said inner, outer and intermediate layers comprising a plastic matrix and a reinforcement, said plastic matrix and reinforcement being extrudable together and forming at least one of the inner, outer and intermediate layers as a reinforced solid or foamed reprocessed plastic with the reinforcement extruded with and contained within the plastic matrix.

* * * * *

UNITED STATES PATENT AND TRADEMARK OFFICE
CERTIFICATE OF CORRECTION

PATENT NO.    : 6,446,674 B1
DATED         : September 10, 2002
INVENTOR(S)   : Hippeläinen et al.

It is certified that error appears in the above-identified patent and that said Letters Patent is hereby corrected as shown below:

<u>Title page,</u>
Item [30], after "961822" insert -- Jun. 20, 1996 [WO] WIPO ...... PCT/FI96/00359 --.

Signed and Sealed this

Fourth Day of February, 2003

JAMES E. ROGAN
*Director of the United States Patent and Trademark Office*